United States Patent
Matteo

Patent Number: 5,697,256
Date of Patent: Dec. 16, 1997

[54] HYBRID DIFFERENTIAL TRANSMISSION

[76] Inventor: Joseph C. Matteo, 721 Summit Lake Ct., Knoxville, Tenn. 37922

[21] Appl. No.: 673,432

[22] Filed: Jun. 28, 1996

[51] Int. Cl.$^6$ ............................................. G05G 11/00
[52] U.S. Cl. ........................ 74/490.04; 74/490.06; 901/21; 475/210
[58] Field of Search ................ 74/490.04, 490.05, 74/490.06, 665 L; 901/21, 28, 15, 25; 475/207, 210, 213, 218, 219

[56] References Cited

U.S. PATENT DOCUMENTS

| | | | |
|---|---|---|---|
| 3,108,498 | 10/1963 | James et al. | 901/25 X |
| 3,600,967 | 8/1971 | Auguin et al. | 74/490.06 |
| 3,790,002 | 2/1974 | Germond et al. | 901/21 X |
| 4,512,710 | 4/1985 | Flatau | 414/735 |
| 4,684,312 | 8/1987 | Antoszewski et al. | 414/735 |
| 4,685,349 | 8/1987 | Wada et al. | 74/490.04 |
| 4,704,065 | 11/1987 | Allared | 414/735 |
| 4,784,010 | 11/1988 | Wood et al. | 74/490.04 |
| 4,805,477 | 2/1989 | Akeel | 74/490.05 |
| 4,828,453 | 5/1989 | Martin et al. | 901/15 X |
| 4,842,474 | 6/1989 | Torii et al. | 414/680 |
| 4,921,293 | 5/1990 | Rouff et al. | 294/111 |
| 4,976,165 | 12/1990 | Nagahama | 74/400 |
| 5,151,008 | 9/1992 | Ishida et al. | 414/744.5 |
| 5,187,996 | 2/1993 | Torii et al. | 74/479 |
| 5,197,846 | 3/1993 | Uno et al. | 414/731 |
| 5,201,239 | 4/1993 | Bundo et al. | 74/479 |
| 5,207,114 | 5/1993 | Salisbury, Jr. et al. | 74/479 R |
| 5,231,889 | 8/1993 | Lee et al. | 74/479 R |
| 5,249,479 | 10/1993 | Torii et al. | 74/479 R |

OTHER PUBLICATIONS

William T. Townsend, "The Effect of Transmission Design on Force–Controlled Manipulator Prformance", MIT Artificial Intelligence Laboratory, Cambridge, MA, Apr. 1988.

*Primary Examiner*—Charles A. Marmor
*Assistant Examiner*—Peter T. Kwon
*Attorney, Agent, or Firm*—Pitts & Brittian, P.C.

[57] ABSTRACT

A hybrid differential transmission for converting two parallel inputs to two orthogonal outputs. The hybrid differential transmission includes two input shafts, an internal structure assembly which includes two ring pulleys, one each driven by an input shaft, an outer structure assembly rotatably mounted to the internal structure assembly and an output pulley assembly which is secured to the outer structure assembly. The output pulley assembly includes two output pulleys each of which are driven by one the ring pulleys.

18 Claims, 6 Drawing Sheets

HYBRID DIFFERENTIAL TRANSMISSION

TECHNICAL FIELD

This invention relates to the field of differential transmission mechanisms and more specifically to a differential transmission wherein two parallel inputs are converted to two orthogonal outputs through a hybrid mechanism of both gears and cables.

BACKGROUND ART

Differential transmission mechanisms are utilized in anthropomorphic applications such as robot shoulders, elbows and wrists. Differential transmission mechanisms convert input motions to output motions changing the axes of rotation. Typical differential transmissions used in such applications are complex requiring bevel gears with shafts cantilevered from bearing supports. Moreover, typically only a single load path exists to the output which generates huge thrust loads.

In multi-axis mechanism applications such as robot arms, two distinct means for actuation are typical: distributed actuation and remote actuation. Distributed actuation locates all drive components such as motors, gears, and sensors at each joint of the mechanism thus distributing the drive components. This type of actuation provides modularity and ease of assembly, however the drive components add weight to the mechanism and degrade performance.

Remote actuation is typically accomplished with cables routed through a complex maze of pulleys to the respective joints. The obvious advantage is reduced mechanism weight achieved at a cost of great complexity.

Typical differential mechanisms are those devices disclosed in the following U.S. Patents:

| U.S. Pat. No. | Inventor(s) | Issue Date |
| --- | --- | --- |
| 4,512,710 | Flatau | April 23, 1985 |
| 4,684,312 | Antoszewski et al. | August 4, 1987 |
| 4,704,065 | Allared | November 3, 1987 |
| 4,842,474 | Torii et al. | June 27 1989 |
| 4,921,293 | Ruoff et al. | May 1, 1990 |
| 4,976,165 | Nagahama | December 11, 1990 |
| 5,151,008 | Ishida et al. | September 29, 1992 |
| 5,187,996 | Torii et al. | February 23, 1993 |
| 5,197,846 | Uno et al. | March 30, 1993 |
| 5,201,239 | Bundo et al. | April 13, 1993 |
| 5,207,114 | Salisbury, Jr. et al. | May 4, 1993 |
| 5,231,889 | Lee et al. | August 3, 1993 |
| 5,249,479 | Torii et al. | October 5, 1993 |

The devices disclosed in the above-identified patents are actuated via distributed actuation or remote actuation, the advantages and disadvantages of which are addressed above. More specifically, U.S. Pat. No. 5,207,114 is an example of a whole arm manipulator which utilizes remote actuation through a cable driven differential. The manipulator utilizes a complex array of cables and pulleys providing all speed reduction and differential action.

Therefore, it is an object of the present invention to provide a hybrid differential transmission which utilizes a combination of remote and distributed actuation.

It is another object of the present invention to provide a hybrid differential transmission which provides a large opening through the center thereof for accommodating signal wires.

Further, it is another object of the present invention to provide a hybrid differential transmission which include cables which can be serviced and replaced with no disassembly of the mechanism.

It is yet another object of the present invention to provide a hybrid differential transmission wherein weight and complexity has been minimized.

It is another object of the present invention to provide a hybrid differential transmission wherein a plurality of the transmissions can be combined for a variety of purposes.

SUMMARY

Other objects and advantages will be accomplished by the present invention which serves to convert input motions to output motions changing the axes of rotation. The hybrid differential transmission is generally comprised of two input shafts, an internal structure assembly which includes two ring pulleys, one each driven by an input shaft, an outer structure assembly is rotatably mounted to the internal structure assembly and an output pulley assembly which is secured to the outer structure assembly. The output pulley assembly includes two output pulleys each of which are driven by one the ring pulleys.

BRIEF DESCRIPTION OF THE DRAWINGS

The above mentioned features of the invention will become more clearly understood from the following detailed description of the invention read together with the drawings in which.

DESCRIPTION OF PREFERRED EMBODIMENTS

A hybrid differential transmission incorporating various features of the present invention is illustrated generally at 10 in the figures. The hybrid differential transmission 10 is designed to convert two parallel input motions to two orthogonal output motions through a hybrid mechanism of both rigid and flexible transmission components. Moreover, the hybrid differential transmission 10 is designed to be a combination of a distributed actuation mechanism and a remote actuation mechanism.

Figure 1:
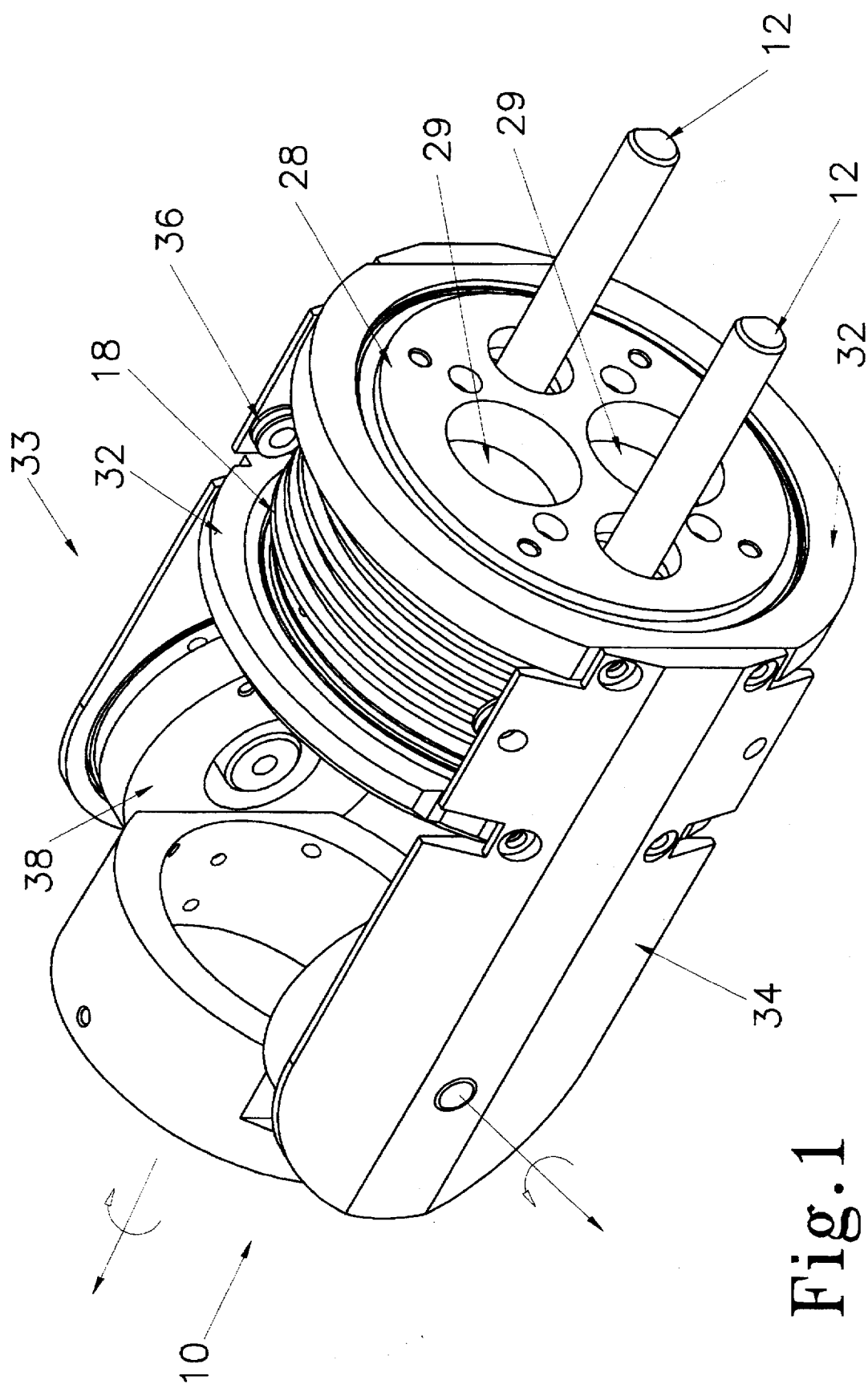
FIG. 1 is a perspective view of the hybrid differential transmission of the present invention.
Figure 4:
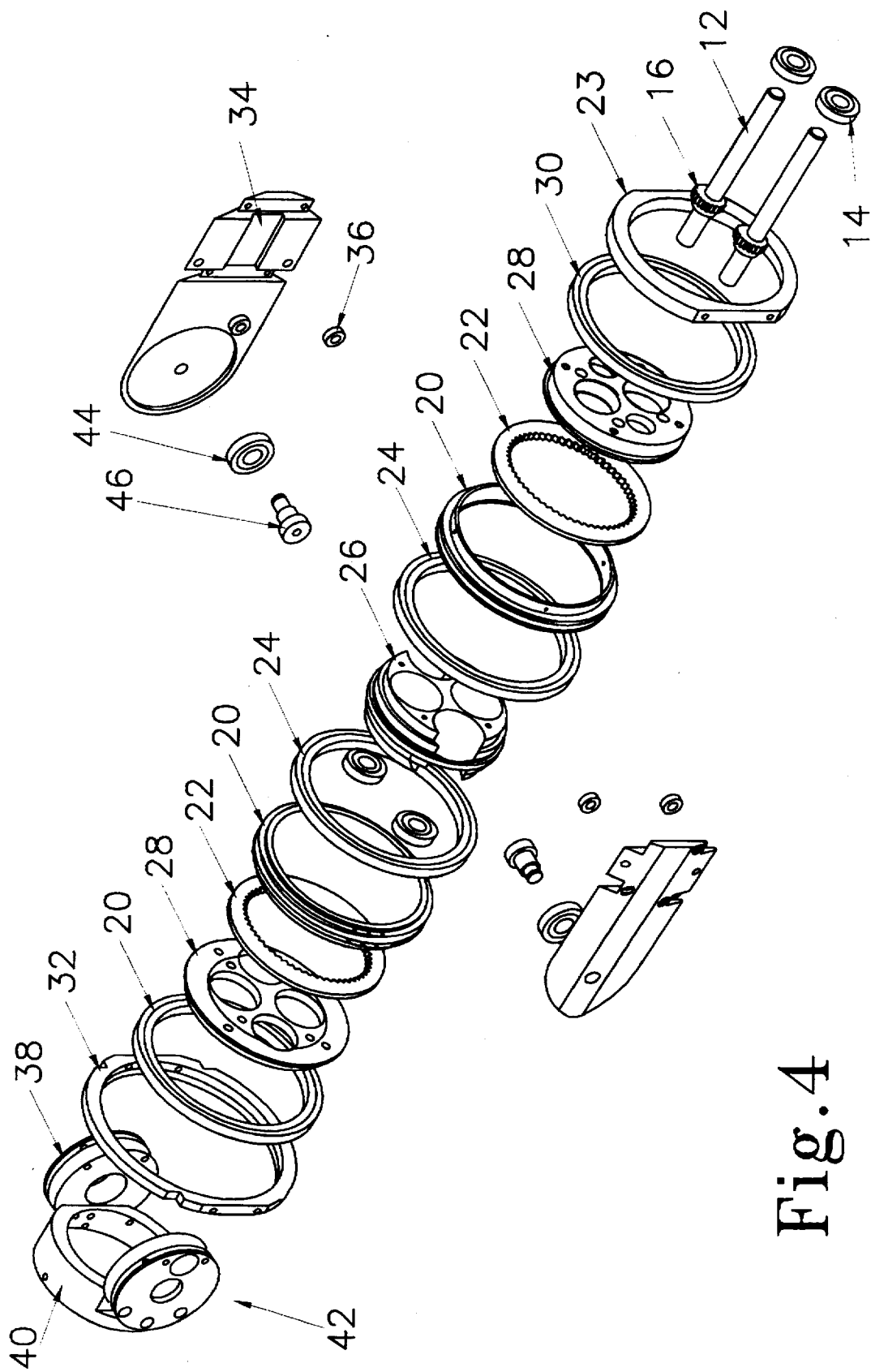
FIG. 4 is an exploded view of the hybrid differential transmission of the present invention.

FIG. 1 illustrates a perspective view of the hybrid differential transmission 10 of the present invention and FIG. 4 illustrates an exploded view of the transmission 10. The hybrid differential transmission 10 is generally comprised of two input shafts 12, an internal structure assembly 18 which includes two ring pulleys 20, one each driven by an input shaft 12, an outer structure assembly 33 rotatably mounted to the internal structure assembly 18 and an output pulley assembly 42 secured to the outer structure assembly 33. The output pulley assembly 42 includes two output pulleys 38 each of which are driven by one the ring pulleys.

Figure 2:
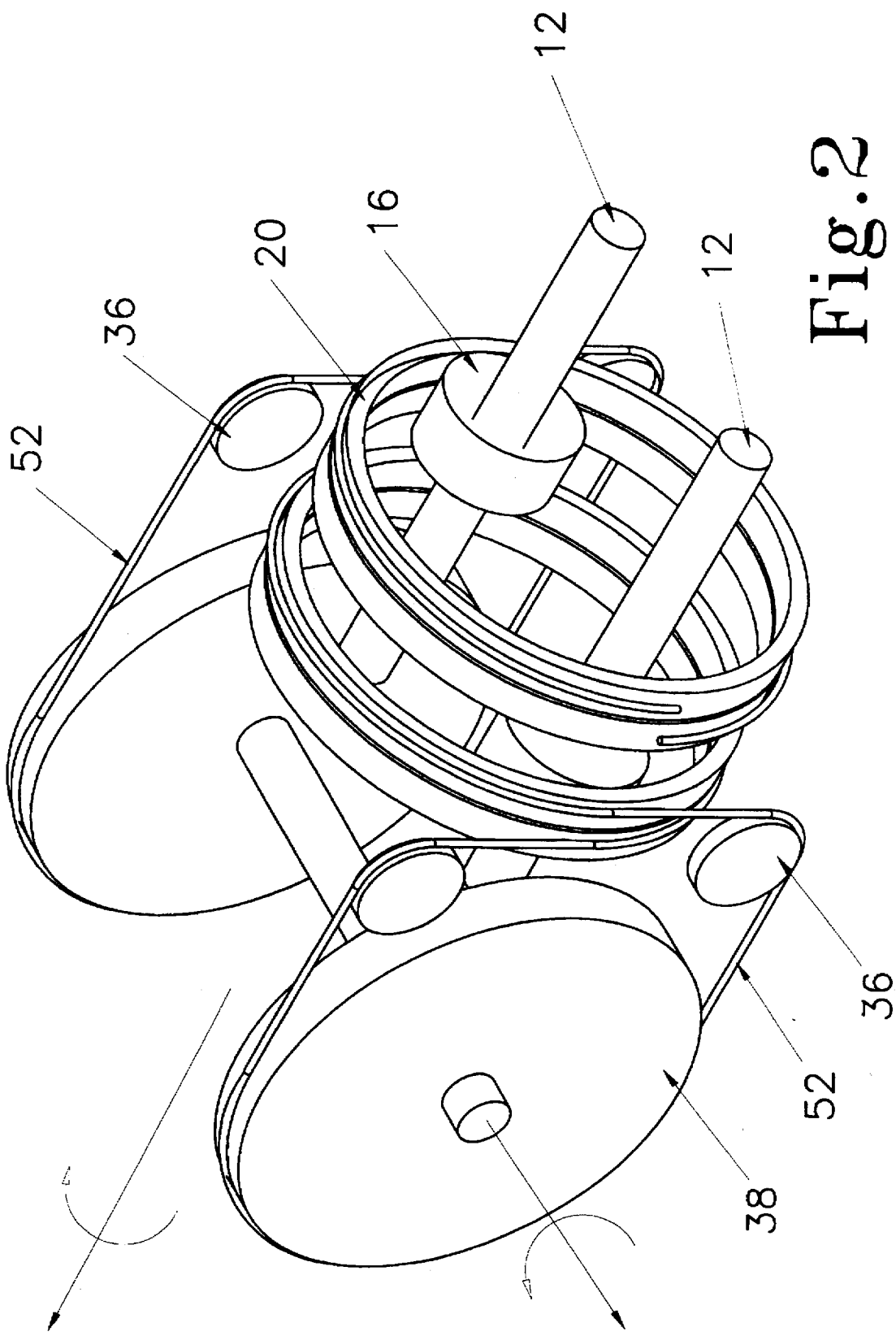
FIG. 2 is a functional diagram of the hybrid differential transmission of the present invention.

FIG. 2 illustrates a functional diagram of the hybrid differential transmission 10 and indicates, in general, the manner in which the hybrid differential transmission 10 functions. The hybrid differential transmission 10 includes two input shafts 12 with a pinion 16 secured to each. Each pinion 16 engages a ring pulley 20. Each ring pulley 20 has a cable 52 wrapped on its outside diameter. The cable 52 is routed around two idle pulleys 36 and an output pulley 38. When the input shafts 12 are rotated the same amount in the same direction only roll output motion results. When the input shafts 12 are rotated the same amount in opposing directions, only bend output motion results. When one input is rotated greater than the other input, a combination of bend and roll motions results. The input shafts 12 equally share loads associated with bend and roll output axes maximizing duty cycle of both inputs.

Figure 3:
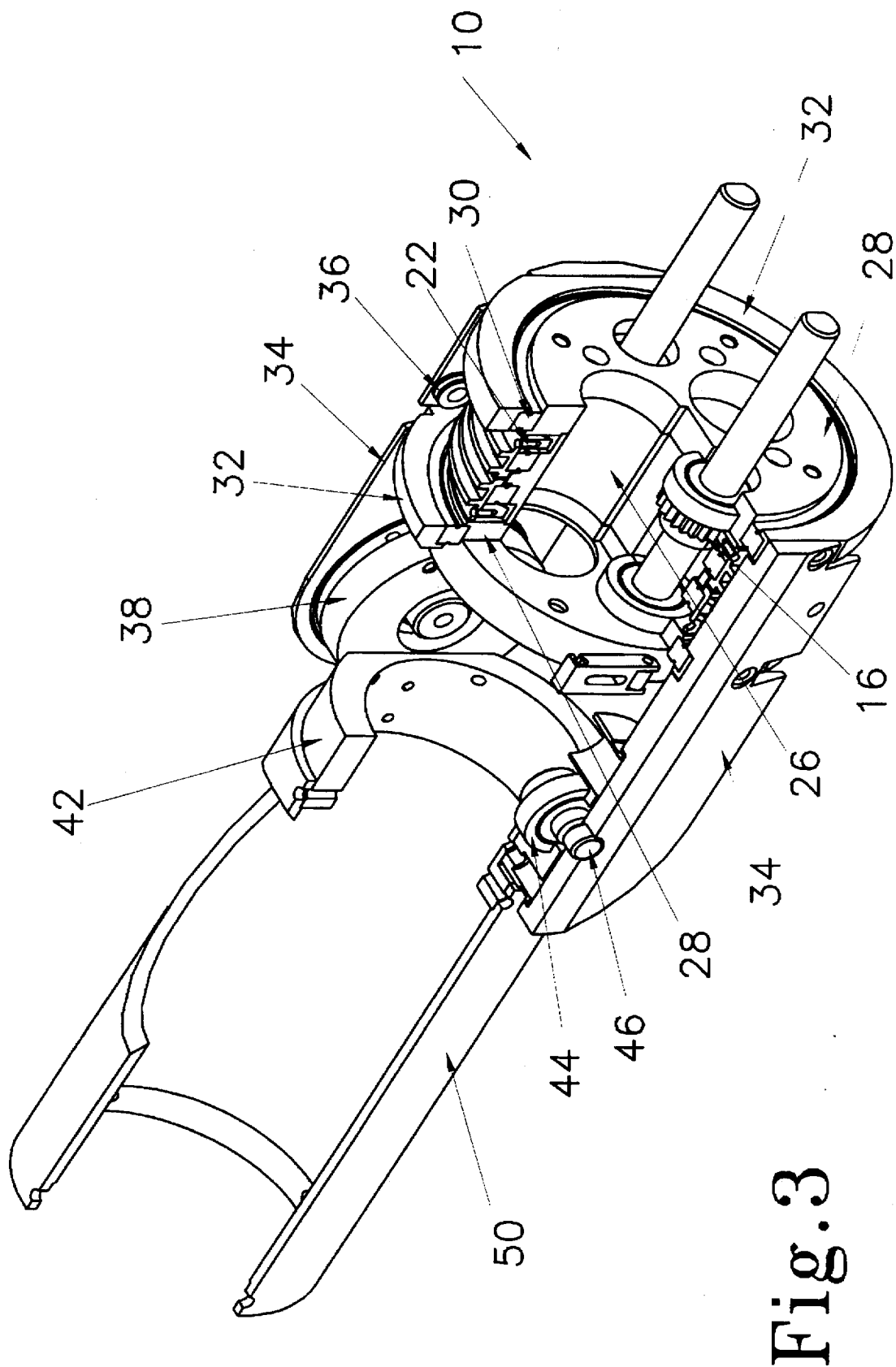
FIG. 3 is a cross sectional view of the hybrid differential transmission of the present invention.

FIG. 3 illustrates a cross sectional view of the preferred embodiment of the hybrid differential transmission 10 assembly showing the translation of the principles of operation illustrated in FIG. 2 to a compactly packaged assembly. FIG. 4 illustrates an exploded view of the hybrid differential transmission 10 of FIG. 3. Referring to FIGS. 3 and 4, the assembly includes two input shafts 12, each of which is supported by two input shaft bearings 14. A pinion 16 is secured to each input shaft 12 and each pinion 16 meshes with separate ring gears 22. In the embodiment depicted in the Figures, a pinion gear is utilized. It will be noted that any suitable power transmission component such as belts, chains, etc. can be used. Each ring gear 22 is mounted inside a ring pulley 20 by screws and is supported by an inner bearing 24 which is secured to an internal structure 26. The internal structure 26 is mounted between two bell caps 28 which contain the input shaft bearings 14. It will be noted that only one input shaft is shown in section view in FIG. 3 and the means by which it is supported. The bell caps 28 and internal structure 26 are bolted together and form the internal structure assembly 18 which is the mounting point for an upper arm link 48. An outer bearing 30 is mounted on each bell cap 28 and each outer bearing 30 is contained in an outer bearing housing 32. The outer bearing housings 32 are secured to the outer structure plates 34 and form the outer structure assembly. The outer bearings 30 allow the outer structure plates 34 to pivot around the internal structure assembly 18 forming the roll axis. A flexible element such as a cable 52 is wrapped around each ring pulley 20 and routed over idle pulleys 36 to an output pulley 38. It will be noted that a chain or a similar device can be used instead of a cable. The idle pulleys 36 are clearly shown in FIG. 4. Both output pulleys 38 are bolted to opposing sides of a link mount 40 thereby forming the output pulley assembly 42 which provides the mounting point for a forearm link. The output pulley assembly 42 is simply supported by two support bearings 44 on shoulder screws 46. Each of the ring gears 22 rotate via the attached pinion gear 16 thereby rotating the respective ring pulley 20 when the respective input shaft 12 is rotated. A large reduction ratio is achieved in this stage, up to 5:1. The ring gear 22, which is secured to the output pulley 38, drives the output pulley 38 via the attached cable 52 with a reduction ratio of up to 1:1.

As shown in FIGS. 1 and 4, the internal structure 26 and bell caps 28 define large internal passages 29 therethrough and through which wiring can be received. The internal structure 26 and the bell caps 28 remain stationary when the outer structure 34 rotates such that wires that run through the large passages 29 do not become twisted.

Figure 5:
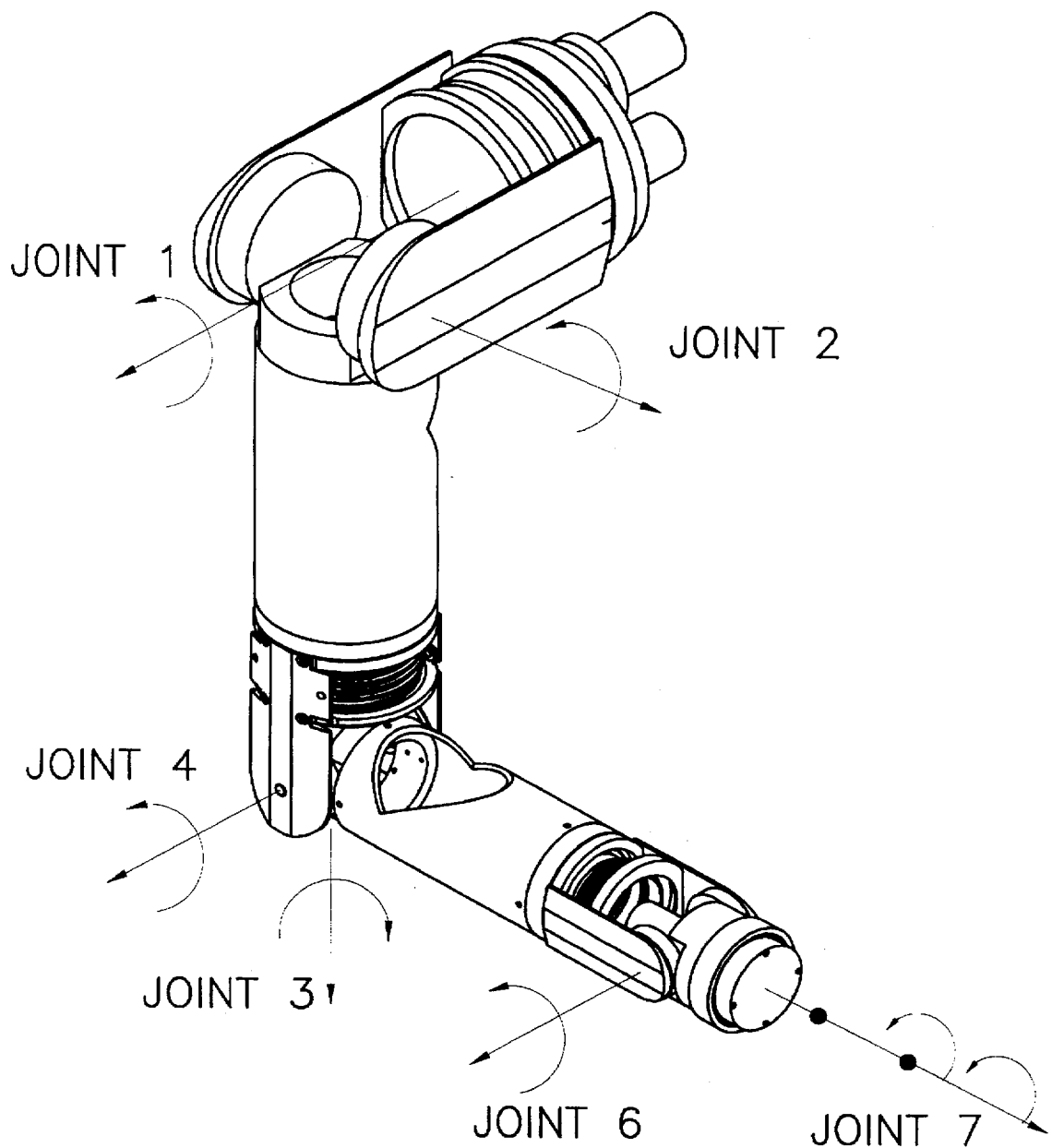
FIG. 5 illustrates the hybrid differential transmission applied to a robot arm.
Figure 6:
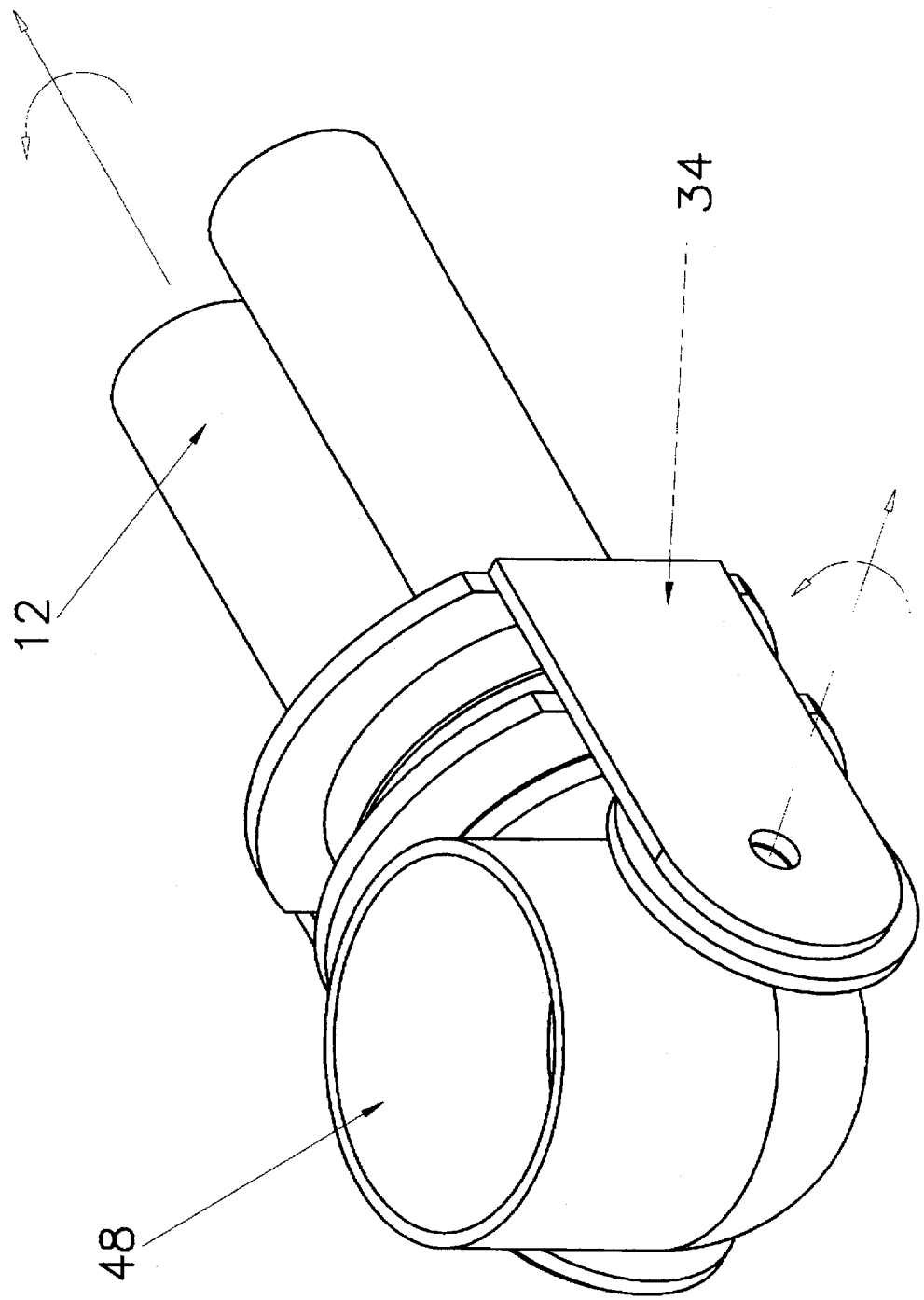
FIG. 6 illustrates the hybrid differential transmission applied to a prosthetic arm.

The hybrid differential transmission 10 can be utilized in both robot and prosthetic applications. FIG. 5 illustrates an example an anthropomorphic manipulator with seven degrees of freedom wherein three hybrid differential transmissions 10 are stacked. Each hybrid transmission 10 includes a forearm link 50, to say that each includes a link, such as link 50, to attach the adjoining hybrid transmission. FIGS. 1, 3 and 5 are specific to the robotic manipulator. FIG. 6 illustrates an example of a prosthetic elbow utilizing the hybrid differential transmission 10.

In both of these applications motors are attached to the internal structure assembly. In robot applications, a motor is mounted to the upper arm link 48 and in prosthetic applications, a motor is mounted to the forearm link 50. In addition, the flexibility of the cable stage allows additional kinematic changes by altering the relative position of bend and roll axes.

From the foregoing description, it will be recognized by those skilled in the art that a hybrid differential transmission offering advantages over the prior art has been provided. Specifically, the hybrid differential transmission has several inherent design features resulting from the combination of rigid and flexible drive components. Narrow profile is achieved by having inline motors that share the load of both output axes. This increases each motor's duty cycle (on time) while decreasing its load allowing the use of smaller motors when compared with typical distributed actuator mechanisms. Large internal passages are a result of the ring gear input stage rather than the typical bevel gears used in differential drives. However, the combination of a cable output stage is the key element that makes the ring gear stage practical, allowing a compact load path change of direction. Flexibility is gained by the ability to alter kinematics with no change to the mechanism other than longer cables. Further, the cables can be serviced and replaced with no disassembly of the mechanism.

It will be noted that performance is not limited to the applications or components described in the preferred embodiments. Other applications of the hybrid differential technology may use belts, various gear technologies or other basic components to achieve the same motions.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,
I claim:

1. A hybrid differential transmission for changing input motions to output motions changing the axes of rotation, said hybrid differential transmission comprising:

a first and second input shaft;

an internal structure assembly including a first and second ring pulleys rotatably mounted therein, each of said first and second ring pulleys driven by said first and second input shafts, respectively;

an outer structure assembly rotatably mounted to said internal structure assembly; and an output pulley assembly mounted to said outer structure and including a first and second output pulley being driven by said first and second ring pulleys, respectively.

2. The hybrid differential transmission of claim 1 wherein said first and second ring pulleys are driven by said first and second input shafts respectively, via a pinion mounted to each of said first and second input shafts.

3. The hybrid differential transmission of claim 1 further including two cables one each being wrapped around each of said first and second ring pulleys and each of said first and second output pulleys such that when said first and second inputs shafts are rotated, said first and second output pulleys rotate.

4. The hybrid differential transmission of claim 3 wherein said outer structure assembly includes two outer structure plates oppositely disposed, each of said outer structure plates carrying two idle pulleys, each of said cables being routed over said idle pulleys and each of said first and second output pulleys.

5. The hybrid differential transmission of claim 1 wherein said output pulley assembly further includes a link mount positioned between said first and second output pulleys and to which said first and second output pulleys are secured, said link mount providing a mounting location for a link.

6. The hybrid differential transmission of claim 1 wherein said internal structure assembly further includes an internal structure and two bell caps each secured to opposing ends of said internal structure, each of said first and second ring pulleys being rotatably mounted between opposing ends of said internal structure and one of said bell caps, said outer structure assembly being rotatably mounted to opposing ends of said bell caps.

7. The hybrid differential transmission of claim 1 wherein said internal structure assembly defines at least one passage therethrough.

8. The hybrid differential transmission of claim 1 wherein said first and second input shafts provide a dual load path such that a load applied to said first and second output pulleys is shared by said first and second input shafts.

9. A hybrid differential transmission for changing input motions to output motions changing the axes of rotation, said hybrid differential transmission comprising:

a first and second input shaft;

an internal structure assembly including a first and second ring pulleys rotatably mounted therein, each of said first and second ring pulleys driven by said first and second input shafts, respectively, said internal structure assembly defining a passage therethrough;

an outer structure assembly rotatably mounted to said internal structure assembly; and an output pulley assembly mounted to said outer structure and including a first and second output pulley being driven by said first and second ring pulleys, respectively, said first and second input shafts providing a dual load path such that a load applied to said first and second output pulleys is shared by said first and second input shafts.

10. The hybrid differential transmission of claim 9 wherein said first and second ring pulleys are driven by said first and second input shafts respectively, via a pinion mounted to each of said first and second input shafts.

11. The hybrid differential transmission of claim 9 further including two cables one each being wrapped around each of said first and second ring pulleys and each of said first and second output pulleys such that when said first and second inputs shafts are rotated, said first and second output pulleys rotate.

12. The hybrid differential transmission of claim 11 wherein said outer structure assembly includes two outer structure plates oppositely disposed, each of said outer structure plates carrying two idle pulleys, each of said cables being routed over said idle pulleys and each of said first and second output pulleys.

13. The hybrid differential transmission of claim 9 wherein said output pulley assembly further includes a link mount positioned between said first and second output pulleys and to which said first and second output pulleys are secured, said link mount providing a mounting location for a link.

14. The hybrid differential transmission of claim 9 wherein said internal structure assembly further includes an internal structure and two bell caps each secured to opposing ends of said internal structure, each of said first and second ring pulleys being rotatably mounted between opposing ends of said internal structure and one of said bell caps, said outer structure assembly being rotatably mounted to opposing ends of said bell caps.

15. A hybrid differential transmission for changing input motions to output motions changing the axes of rotation, said hybrid differential transmission comprising:

a first and second input shaft each defining a pinion secured thereto;

an internal structure assembly including a first and second ring pulleys rotatably mounted therein, each of said first and second ring pulleys driven by said pinion secured to each of said first and second input shafts, respectively, said internal structure assembly defining a passage therethrough;

an outer structure assembly rotatably mounted to said internal structure assembly; and an output pulley assembly mounted to said outer structure and including a first and second output pulley being driven by said first and second ring pulleys, respectively, via two cables one each wrapped around each said first and second ring pulleys and each of said first and second output pulleys, said first and second input shafts providing a dual load path such that a load applied to said first and second output pulleys is shared by said first and second input shafts.

16. The hybrid differential transmission of claim 15 wherein said outer structure assembly includes two outer structure plates oppositely disposed, each of said outer structure plates carrying two idle pulleys, each of said cables being routed over said idle pulleys and each of said first and second output pulleys.

17. The hybrid differential transmission of claim 15 wherein said output pulley assembly further includes a link mount positioned between said first and second output pulleys and to which said first and second output pulleys are secured, said link mount providing a mounting location for a link.

18. The hybrid differential transmission of claim 15 wherein said internal structure assembly further includes an internal structure and two bell caps each secured to opposing ends of said internal structure, each of said first and second ring pulleys being rotatably mounted between opposing ends of said internal structure and one of said bell caps, said outer structure assembly being rotatably mounted to opposing ends of said bell caps.

* * * * *